(No Model.)
A. SIMPSON.
HAY PRESS.
No. 340,828. Patented Apr. 27, 1886.
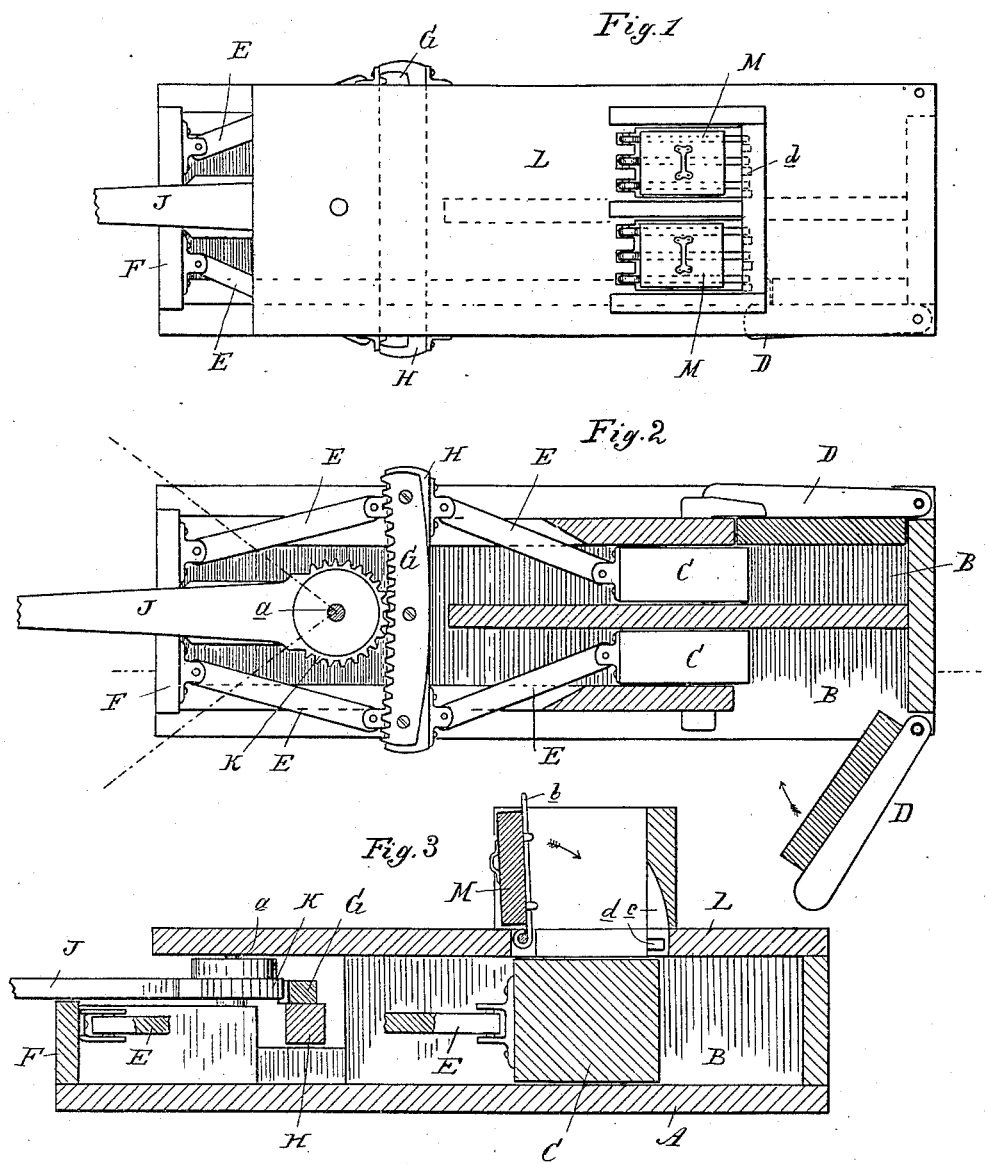
Attest:
John Schuman.
Inventor:
Abijah Simpson.
by his Atty

UNITED STATES PATENT OFFICE.

ABIJAH SIMPSON, OF SMITH CREEK, MICHIGAN, ASSIGNOR OF ONE-HALF TO WILLIAM R. GILLETT, OF SAME PLACE.

HAY-PRESS.

SPECIFICATION forming part of Letters Patent No. 340,828, dated April 27, 1886.

Application filed January 14, 1886. Serial No. 188,516. (No model.)

*To all whom it may concern:*

Be it known that I, ABIJAH SIMPSON, of Smith Creek, in the county of St. Clair and State of Michigan, have invented new and useful Improvements in Hay-Presses; and I do hereby declare that the following is a full, clear, and exact description thereof, reference being had to the accompanying drawings, which form a part of this specification.

This invention relates to certain new and useful improvements in hay-presses.

The invention consists in the peculiar construction of the mechanism employed for imparting a reciprocating movement to the plungers; in the peculiar construction and arrangement of the feed-doors, and in the peculiar construction, arrangement, and combinations of the various parts, all as more fully hereinafter set forth.

Figure 1 is a top plan of my improved machine. Fig. 2 is a similar view with the top removed. Fig. 3 is a vertical horizontal section.

In the accompanying drawings, which form a part of this specification, A represents a suitable base, upon which are erected the baling-chambers B B, in the side wall of each of which is placed the door D, through which the bales are removed after being pressed, as in the ordinary manner.

C are the plungers, each of which is pivotally connected to the lower ends of the toggle-levers E, the opposite ends of which are in like manner secured to the head-block F. These toggles are connected together at their joints by a cross-bar, H, upon which is secured the rack-bar G.

J is a sweep-lever, the inner end of which carries a pinion, K, which engages with the rack G, said lever being properly fulcrumed, as at *a*.

L is the top plate, in which the feed-doors M are placed, and so located that hay can be introduced into the baling-chambers when the plungers are in their retracted positions. These doors are slightly smaller than the openings through the top, and they are provided with fingers *b*, which have a little lateral play on their pivots, and which, when the doors are closed, pass through the grooves *c*, formed in the corresponding edge of the door-opening, and are locked in their closed positions by giving them a slight lateral adjustment, so that the ends of the fingers will enter the lateral grooves *d*, as shown in Fig. 3.

If desired, three-sided hoppers or boxes may be erected around the door-openings, to facilitate the feeding of hay to the baling-chambers, in which case, when the doors are open into a vertical position, such doors will form the remaining side of the box or hopper.

In practice hay is fed to but one of the baling-chambers at a time, the sweep-lever standing at the opposite side of the machine. After this chamber is filled the draft is applied to the end of the lever J, which is thereby drawn to its reverse position, the engagement of the pinion with the rack compelling the toggle of the chamber in question to advance its plunger and compress the hay before it, while the movement of the opposite toggle is to retract its plunger, so that the other chamber may be filled, and so on alternately operating the plungers to press the hay in the baling-chambers.

It will be observed that by the construction of the feed-doors they do not bind in the door-openings, as in the ordinary constructions, but that, while they are locked as against outward pressure, they allow the ends of the hay that may project through after the door is closed to be drawn into the chamber without effecting any strain upon the parts.

What I claim as my invention is—

1. In a hay-press, the combination, with the transversely-arranged rack G, head-block F, and plungers C, of the toggle-levers, pivotally connected with said plungers, rack, and head-block, as described, and the sweep-lever J and pinion K, carried thereby and engaging said rack, substantially as and for the purposes specified.

2. In a hay-press, the combination, with the top plate, L, having lateral grooves *d*, of the feed-doors M, provided with the fingers *b*, as and for the purposes described.

3. In a hay-press, the combination of the baling-chambers B, plungers C, doors D, toggle-levers E, rack G, lever J, pinion K, and feed-doors M, provided with the fingers *b*, when constructed, arranged, and operating substantially as and for the purposes specified.

ABIJAH $\times$ SIMPSON.
his / mark.

Witnesses:
H. S. SPRAGUE,
EDMOND J. SCULLY.